(12) United States Patent
Ma

(10) Patent No.: US 11,130,879 B2
(45) Date of Patent: Sep. 28, 2021

(54) DISPERSANTS, COATING COMPOSITIONS INCLUDING DISPERSANTS, AND METHODS OF FORMING THE SAME

(71) Applicant: AXALTA COATING SYSTEMS IP CO., LLC, Wilmington, DE (US)

(72) Inventor: Sheau-Hwa Ma, West Chester, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 219 days.

(21) Appl. No.: 16/225,702

(22) Filed: Dec. 19, 2018

(65) Prior Publication Data

US 2019/0203068 A1 Jul. 4, 2019

Related U.S. Application Data

(60) Provisional application No. 62/611,479, filed on Dec. 28, 2017.

(51) Int. Cl.

| C09D 151/08 | (2006.01) |
|---|---|
| C09D 151/00 | (2006.01) |
| C08L 39/04 | (2006.01) |
| C09D 5/02 | (2006.01) |
| C09D 7/45 | (2018.01) |
| C08F 290/06 | (2006.01) |
| C09D 133/14 | (2006.01) |

(52) U.S. Cl.
CPC ........ *C09D 151/08* (2013.01); *C08F 290/062* (2013.01); *C08L 39/04* (2013.01); *C09D 5/027* (2013.01); *C09D 5/028* (2013.01); *C09D 7/45* (2018.01); *C09D 133/14* (2013.01); *C09D 151/006* (2013.01)

(58) Field of Classification Search
CPC .......................... C09D 151/08; C08F 220/34
See application file for complete search history.

(56) References Cited

U.S. PATENT DOCUMENTS

| 5,753,759 | A | * | 5/1998 | Hartmann | ............... | C09D 17/00 |
| | | | | | | 525/218 |
| 6,362,274 | B1 | | 3/2002 | Legrand et al. | | |
| 6,472,463 | B1 | * | 10/2002 | Ma | ........................ | C08F 257/02 |
| | | | | | | 524/504 |
| 6,599,973 | B1 | | 7/2003 | Visscher et al. | | |
| 6,656,595 | B2 | * | 12/2003 | Nakajima | ............. | C08F 257/02 |
| | | | | | | 428/413 |
| 7,026,392 | B2 | | 4/2006 | Nakajima et al. | | |
| 7,863,351 | B2 | | 1/2011 | Nishiwaki et al. | | |
| 8,034,888 | B2 | | 10/2011 | Nguyen-Kim et al. | | |
| 8,211,970 | B2 | | 7/2012 | Huybrechts et al. | | |
| 8,540,974 | B2 | | 9/2013 | Braig et al. | | |
| 8,822,592 | B2 | * | 9/2014 | Kok | ...................... | B01F 17/005 |
| | | | | | | 524/556 |
| 9,403,986 | B2 | | 8/2016 | Ma | | |
| 2004/0143035 | A1 | | 7/2004 | Goebelt et al. | | |
| 2007/0244023 | A1 | * | 10/2007 | Brodt | ................... | C11D 3/0021 |
| | | | | | | 510/405 |
| 2010/0036045 | A1 | * | 2/2010 | Huybrechts | ........... | C08F 290/04 |
| | | | | | | 524/507 |
| 2011/0144263 | A1 | | 6/2011 | Ma | | |
| 2012/0083552 | A1 | * | 4/2012 | Ma | ............................ | C09C 3/10 |
| | | | | | | 523/436 |

FOREIGN PATENT DOCUMENTS

| EP | 1242491 B1 | 5/2015 |
| EP | 2445944 B1 | 5/2017 |
| WO | 2017093368 A1 | 6/2017 |

OTHER PUBLICATIONS

European Patent Office, Official action for European Patent Application 10 2018 133 554.7, dated Apr. 4, 2019, 8 pages.

* cited by examiner

*Primary Examiner* — Marks S Kaucher
(74) *Attorney, Agent, or Firm* — Lorenz & Kopf LLP

(57) ABSTRACT

A graft copolymer is provided herein. The graft copolymer includes a polymeric backbone. The polymeric backbone includes a cyclic amine-containing moiety. The graft copolymer further includes a first side chain bound to the polymeric backbone, wherein the first side chain includes an acid-containing moiety. The graft copolymer further includes a second side chain bound to the polymeric backbone, wherein the second side chain includes an alkoxylated moiety. Another graft copolymer is provided herein. The graft copolymer includes a polymeric backbone. The polymeric backbone includes a quaternary ammonium moiety formed from a reaction of an amine-containing moiety and an alkylation agent. The graft copolymer further includes a first side chain bound to the polymeric backbone, wherein the first side chain includes an acid-containing moiety. The graft copolymer further includes a second side chain bound to the polymeric backbone, wherein the second side chain includes an alkoxylated moiety.

20 Claims, No Drawings

DISPERSANTS, COATING COMPOSITIONS INCLUDING DISPERSANTS, AND METHODS OF FORMING THE SAME

CROSS-REFERENCE TO RELATED APPLICATION

This application claims the benefit of U.S. Provisional Application No. 62/611,479, filed Dec. 28, 2017, which is hereby incorporated in its entirety by reference.

TECHNICAL FIELD

The technical field generally relates to a graft copolymer that is capable of dispersing a wide variety of organic and inorganic pigments to form a pigment dispersion. The pigment dispersion is especially useful to form a water borne pigmented coating composition.

BACKGROUND

Polymeric materials are known which are effective for dispersing pigments in water and organic solvents and used to form pigment dispersions of uniform color that are useful in formulating waterborne coating compositions. Such pigment dispersions are widely used, for example, in exterior coating for automobiles and trucks.

Much of the past activity concerning pigment dispersants has been with random copolymers, but such relatively inefficient materials are now being replaced by structured pigment dispersants. Graft copolymers are generally composed of a macromonomer grafted onto a polymer backbone and have attached to either the macromonomer, the backbone or both, one or more groups known as pigment anchoring groups which are designed to adsorb on the surface of a pigment particle and thereby anchor the polymer to the pigment surface.

While the past work indicates that graft copolymers are outstanding dispersants, the graft copolymers containing certain pigment anchoring groups can also suffer from certain significant drawbacks. For instance, the pigment anchoring groups may not selectively adsorb certain pigment types and/or can be displaced from pigment surfaces by polar solvents or other polar groups present in a coating composition. Ineffective anchoring of the dispersant to a pigment particle surface is highly undesired, since it can allow the pigment particles to flocculate, or cluster together, and can result, ultimately, in coatings of poor color quality.

Accordingly, it is desirable to improve the performance of pigment dispersants, and in particular to dispersants having an increased effectiveness in dispersing a wide range of pigments, especially in coating compositions. Furthermore, other desirable features and characteristics will become apparent from the subsequent detailed description and the appended claims, taken in conjunction with this background.

BRIEF SUMMARY

A graft copolymer is provided herein. The graft copolymer includes, but is not limited to, a polymeric backbone. The polymeric backbone includes, but is not limited to, a cyclic amine-containing moiety. The graft copolymer further includes, but is not limited to, a first side chain bound to the polymeric backbone, wherein the first side chain includes, but is not limited to, an acid-containing moiety. The graft copolymer further includes, but is not limited to, a second side chain bound to the polymeric backbone, wherein the second side chain includes, but is not limited to, an alkoxylated moiety.

Another graft copolymer is provided herein. The graft copolymer includes, but is not limited to, a polymeric backbone. The polymeric backbone includes, but is not limited to, a quaternary ammonium moiety formed from a reaction of an amine-containing moiety and an alkylation agent. The graft copolymer further includes, but is not limited to, a first side chain bound to the polymeric backbone, wherein the first side chain includes, but is not limited to, an acid-containing moiety. The graft copolymer further includes, but is not limited to, a second side chain bound to the polymeric backbone, wherein the second side chain includes, but is not limited to, an alkoxylated moiety.

A coating composition is provided herein. The coating composition includes, but is not limited to, a pigment. The coating composition further includes, but is not limited to, a graft copolymer for dispersing the pigment. The graft copolymer includes, but is not limited to, a polymeric backbone. The polymeric backbone includes, but is not limited to, a cyclic amine-containing moiety. The graft copolymer further includes, but is not limited to, a first side chain bound to the polymeric backbone, wherein the first side chain includes, but is not limited to, an acid-containing moiety. The graft copolymer further includes, but is not limited to, a second side chain bound to the polymeric backbone, wherein the second side chain includes, but is not limited to, an alkoxylated moiety. The coating composition further includes, but is not limited to, water. The coating composition optionally further includes, but is not limited to, organic solvent, wherein the coating composition includes the water in an amount of at least 50 wt. % based on a total weight percent of a combination of the water and the organic solvent in the coating composition when the organic solvent is present.

DETAILED DESCRIPTION

The following detailed description is merely exemplary in nature and is not intended to limit coating compositions as described herein. Furthermore, there is no intention to be bound by any theory presented in the preceding background or the following detailed description.

Also, the use of "a" or "an" are employed to describe elements and components described herein. This is done merely for convenience and to give a general sense of the scope of the disclosure. This description should be read to include one or at least one and the singular also includes the plural unless the context specifically states otherwise.

The use of numerical values in the various ranges specified in this application, unless expressly indicated otherwise, are stated as approximations as though the minimum and maximum values within the stated ranges were both preceded by the word "about". In this manner, slight variations above and below the stated ranges can be used to achieve substantially the same results as values within the ranges. Also, the disclosure of these ranges is intended as a continuous range including every value between the minimum and maximum values.

As used herein, "$M_w$" means weight average molecular weight and "$M_n$" means number average molecular weight. The units for any of the stated values or ranges is in daltons. The molecular weights are determined by gel permeation chromatography (GPC) using a polystyrene standard. In embodiments including the quaternary ammonium moiety, the weight average molecular weight may be determined prior to alkylation of the graft copolymer.

The term "macromonomer" means a polymer having at least two repeat units and having an olefinically unsaturated group (e.g., an ethylenically unsaturated group) that can be polymerized via free radical polymerization techniques. In some embodiments, the olefinically unsaturated group can be a terminal olefinically unsaturated group. Suitable macromonomers can have, in some embodiments, a $M_w$ in the range of from about 500 to about 50,000. In other embodiments, the $M_w$ of the macromonomer can be in the range of from about 500 to about 40,000, and, in other embodiments, the $M_w$ of the macromonomer can be in the range of from about 500 to about 30,000. Upon polymerization of the macromonomer with other olefinically unsaturated monomers, the olefinically unsaturated portion of the macromonomer becomes a part of the backbone of the graft polymer, and the remainder of the macromonomer forms the side chain of the graft copolymer.

The term "moiety" means at least any portion of a compound, a monomer, an oligomer, a macromonomer, a pre-polymer, or a polymer. The compound, monomer, oligomer, macromonomer, or pre-polymer may be polymerized to form a polymer with the moiety still present albeit at least a portion of compound, monomer, oligomer, macromonomer, or pre-polymer is included in the structure of the polymer.

A graft copolymer is provided herein. The graft copolymer may be included in a dispersant for dispersing a pigment. The graft copolymer includes a polymeric backbone, a first side chain bound to the polymeric backbone, and a second side chain also bound to the polymeric backbone. The polymeric backbone includes an amine-containing moiety. The first side chain includes an acid-containing moiety and the second side chain includes an alkoxylated moiety (i.e., an alkoxy-containing moiety). The graft copolymer may be formed from a reaction mixture including an olefinically unsaturated amine-containing compound, wherein the olefinically unsaturated amine-containing compound forms the amine-containing moiety. In certain embodiments, the olefinically unsaturated amine-containing compound is further defined as an olefinically unsaturated cyclic amine-containing compound such that the olefinically unsaturated cyclic amine-containing compound forms the cyclic amine-containing moiety. The reaction mixture may further include an olefinically unsaturated acid-containing compound, wherein the olefinically unsaturated acid-containing compound forms the acid-containing moiety. The reaction mixture may further include an olefinically unsaturated alkoxylated compound, wherein the olefinically unsaturated alkoxylated compound forms the alkoxylated moiety.

The amine-containing moiety may be at least any portion of a compound, a monomer, an oligomer, a macromonomer, a pre-polymer, or a polymer including an amine group. The amine group may be a primary amine group, a secondary amine group, a tertiary amine group, or combinations thereof. In certain embodiments, the amine group is a tertiary amine group. As will be described in greater detail below, a tertiary amine group may be directly alkylated whereas primary and secondary amine groups may require additional steps to alkylate these amines.

In certain embodiments, the amine-containing moiety is further defined as a cyclic amine-containing moiety. The cyclic amine-containing moiety may include a polar heterocyclic group with a 5 or 6 membered ring, containing a ring nitrogen atom. The polar heterocyclic group may contain more than one nitrogen atom as part of the ring and may also contain a sulfur and/or oxygen atom in the ring. The polar heterocyclic group may be a mononuclear or di-nuclear group, wherein at least one of the rings must be the above defined 5 or 6 membered ring. As used herein, the term "mononuclear" refers to a lone 5 or 6 membered ring, and the term "di-nuclear" refers to a 5 or 6 membered ring fused to another 5 or 6 membered ring. In certain embodiments, the polar heterocyclic group is a mononuclear heterocyclic group. Example of suitable heterocyclic groups includes, but are not limited to, triazole, pyrimidine, imidazole, pyridine, morpholine, pyrrolidine, piperazine, piperidine, benzimidazole, benzothiazole and triazine groups. These groups may be unsubstituted or may contain substituents such as, e.g., alkyl, aryl, halogen, and alkoxy groups. In certain embodiments, the heterocyclic groups are lower alkyl substituted imidazole derivatives, such as 2-methyl imidazole and 4-methyl imidazole.

The cyclic amine-containing compound that may form the cyclic amine-containing moiety may be any olefinically unsaturated monomer including a polar heterocyclic group defined above. Examples of suitable olefinically unsaturated monomers may include, but are not limited to, 1-vinyl imidazole, 2-vinyl pyridine, 4-vinylpyridine, and vinyl carbazole.

The cyclic amine-containing compound can also be a pre-reacted compound having a polar heterocyclic group defined above. For example, it can be the reaction product of an epoxy functional unsaturated monomer, such as glycidyl (meth)acrylate or an isocyanato-functional monomer, such as isocyanatoethyl (meth)acrylate, with a heterocyclic functional compound which is able to react with the epoxy group or an isocyanato group. The epoxy group or cyanate groups can be reacted for example with a heterocyclic compound having an active hydrogen atom like —NH—, —NH$_2$, —COOH and —SH. Examples of heterocyclic compounds with an active H atom are pyrrolidine, morpholine, piperidine, imidazole, piperazine, 2-mercaptobenzthiazole, 1,2,4-triazole and pyrazole.

The cyclic amine-containing compound to be used to incorporate into the polymeric backbone the polar heterocyclic group defined above shall also include those monomers polymerized in the backbone which are subsequently modified with the polar heterocyclic group defined above. The heterocyclic group can be subsequently incorporated indirectly e.g. through urethane and/or urea linkages. As a non-limiting example N-(3-aminopropyl)imidazole can be reacted with isophorone diisocyanate on a molar basis to form an intermediate imidazole functional urea with one unreacted isocyanate functional group which in a subsequent step can be reacted with amino groups of a polymerized monomer in the polymeric backbone. This amino functional group can be obtained through the copolymerization of e.g. t-butylaminoethyl methacrylate. The isocyanate functional heterocyclic urea intermediate can also be reacted with a hydroxyl group on the polymeric backbone to form a urethane linkage. Heterocyclic functional intermediates with an isocyanate functional group may also be formed through reaction of hydroxyl functional heterocyclic derivatives, such as 2-hydroxyethyl morpholine with di- and/or polyisocyanates.

In certain embodiments, the amine-containing compound includes an amine functional monomer and may form the amine-containing moiety. Examples of suitable amine functional monomers can include, but are not limited to, N,N-dimethylaminoethyl acrylate, N,N-dimethylaminoethyl methacrylate, N,N-diethylaminoethyl acrylate, N,N-diethylaminoethyl methacrylate, N-t-butylaminoethyl methacrylate, N-t-butylaminoethyl acrylate, 2-N-morpholinoethyl acrylate, 2-N-morpholinoethyl methacrylate, or combinations thereof. Examples of suitable cyclic amine functional monomers can include, but are not limited to, N-vinyl imidazole, 2-vinyl pyridine, 4-vinylpyridine, vinyl carbazole, or combinations thereof. Alternatively, the amine-containing moiety may be obtained by reacting an amine compound with a monomer or a copolymer containing epoxy groups. In an exemplary embodiment, the amine-containing moiety is formed from N-vinyl imidazole.

The reaction mixture to form the graft copolymer may include the amine-containing compound in an amount of from about 0.1 to about 50, alternatively from about 1 to about 30, or alternatively from about 5 to about 15, wt. % based on a total weight of a combination of the monomers and macromonomers in the reaction mixture to form the graft copolymer.

In certain embodiments, the polymeric backbone includes a quaternary ammonium moiety formed from a reaction of the amine-containing moiety and an alkylation agent, organic acids, or a combination thereof. The amine-containing moiety formed from the amine-containing compound, including N-vinyl imidazole and any of the amine functional monomers listed above, may be quaternized to form the polymeric backbone including quaternary ammonium moieties. The quaternary ammonium moiety may be at least any portion of a compound, a monomer, an oligomer, a macromonomer, a pre-polymer, or a polymer including a quaternary ammonium group. Quaternary ammonium moieties can be formed by contacting the amine groups with the alkylation agent, the organic acid, or a combination thereof. It is to be appreciated that alkylation of the amine group may be before or after polymerization of the compound including the amine group into the polymeric backbone. In certain embodiments, the quaternary ammonium moiety is formed from the reaction of the amine-containing moiety and the alkylation agent after the amine-containing moiety has been polymerized into the polymeric backbone. In some embodiments, no greater than 10 percent, no greater than 20 percent, or no greater than 50 percent of the amine-containing moieties can be converted to the quaternary ammonium moieties. In further embodiments, up to 100 percent of the amine-containing moieties can be converted to the quaternary ammonium moieties. Examples of suitable alkylation agents can include, but are not limited to, aralkyl halides, alkyl halides, alkyl aryl sulfonates, trialkyl phosphate halides, benzyl chloride, methyl p-toluenesulfonate (MTS), dimethyl sulfate, or combinations thereof. Suitable organic acids include, for example, acids containing at least 2 carbon atoms. In some embodiments, the organic acid can contain at least 6 carbon atoms and in further embodiments, the organic acid can contain at least 8 carbon atoms. Such acids include, for example, but are not limited to, acetic acid, decanoic acid, caproic acid, lauric acid, myristic acid, palmitic acid, stearic acid, or combination thereof. In an exemplary embodiment, the alkylation agent includes methyl p-toluenesulfonate (MTS). The reaction mixture to form the graft copolymer may include the alkylation agent in an amount of from about 0.1 to about 30, alternatively from about 0.5 to about 15, or alternatively from about 1 to about 10, wt. % based on a total weight of a combination of the monomers and macromonomers in the reaction mixture to form the graft copolymer (i.e., excluding the catalysts).

The acid-containing moiety may be at least any portion of a compound, a monomer, an oligomer, a macromonomer, a pre-polymer, or a polymer including an acid group. The acid-containing moiety may be formed from an olefinically unsaturated acid-containing macromonomer. The acid-containing macromonomer may have a weight average molecular weight of at least 500, alternatively from about 500 to about 20,000, or alternatively from about 500 to about 10,000. Methods for forming the acid-containing macromonomer can include, but are not limited to, group transfer polymerization, reversible addition-fragmentation chain transfer, atom transfer radical polymerization, and end group modification procedures. In some embodiments, the methods can form a macromonomer having one terminal ethylenically unsaturated group that can polymerize with the reaction mixture at least further including the amine-containing compound (e.g., N-vinyl imidazole) to form the graft copolymer having the first side chain that is attached to the polymeric backbone at a single terminal point.

The acid-containing macromonomer may be formed from a reaction mixture including an olefinically unsaturated acid-functional monomer in the presence of a catalytic chain transfer agent. The catalytic chain transfer agent may be utilized to ensure that the acid-containing macromonomer only has one terminal olefinically unsaturated group which may polymerize with the reaction mixture including at least of polymeric backbone monomers. In certain embodiments, the macromonomer is polymerized in the presence of a free radical initiator and the catalytic chain transfer agent, such as a cobalt chain transfer agent.

In various embodiments, in a first step of the process for preparing the acid-containing macromonomer, the monomers are blended with an inert organic solvent which is water miscible or water dispersible and the chain transfer agent, such as the cobalt chain transfer agent, and heated usually to the reflux temperature of the reaction mixture. In subsequent steps additional monomers, the chain transfer agent and the free radical initiator are added, and polymerization is continued until a macromonomer is formed of the desired molecular weight.

Non-limiting examples of suitable cobalt chain transfer agents include, but are not limited to, Co (II) or Co (III) chelate chain transfer agents. Additional non-limiting examples of suitable cobalt chain transfer agents are described in U.S. Pat. Nos. 4,680,352 and 4,722,984. In certain embodiments, the cobalt chain transfer agent includes pentacyanocobaltate (II or III), diaquabis(borondifluorodimethyl-glyoximato)cobaltate (II or III), diaquabis (borondifluorophenylglyoximato)cobaltate (II or III), or combinations thereof. The chain transfer agents may be used in an amount of from about 5 to about 1000 ppm based on the total amount of the monomers used to form the acid-containing macromonomer.

Non-limiting examples of suitable free radical initiators includes, but are not limited to, azoinitiators, such as 2,2'-azobis(2,4 dimethylpentanenitrile), 2,2'-azobis(2-methyl-propanenitrile), 2,2'-azobis(2-methylbutanenitrile), 1,1'-azo (cyclohexane carbonitrile), 4,4'-azobis(4-cyanopentanoic) acid, or combinations thereof. The free radical initiators may be used in an amount of from about 0.5 to about 5 wt. % based on a total weight of the monomers used to form the acid-containing macromonomer.

Non-limiting examples of suitable solvents that can be used to form the acid-containing macromonomer include aromatics, aliphatics, ketones, such as methyl ethyl ketone, isobutyl ketone, ethyl amyl ketone, acetone, alcohols, such as methanol, ethanol n-butanol isopropanol esters, such as ethyl acetate, glycols, such as ethylene glycol propylene glycol ethers, such as tetrahydrofuran, ethylene glycol mono butyl ether, or combinations thereof.

The acid-containing macromonomer may be neutralized after it has been formed and before polymerization with the polymeric backbone monomers. Neutralization of the acid-containing macromonomer prior to polymerization with the polymeric backbone may avoid internal salt formation with base groups, e.g. amino or imidazole groups, when polymerizing the acid-containing macromonomer with the polymeric backbone monomers. Salt formation can lead to unwanted increase of viscosity of a resulting dispersion including the graft copolymer. Examples of suitable neutralizing agents for the acid groups include, but are not limited to, inorganic bases, such as ammonium hydroxide, sodium hydroxide and potassium hydroxide, organic amines, such as amino methyl propanol, amino ethyl propanol, dimethyl ethanol amine, triethylamine, dimethylethanolamine, triethanolamine, dimethylaminomethylpropanol and aminomethylpropanol, or combinations thereof. In certain embodiments, the amine is amino methyl propanol and the inorganic base is ammonium hydroxide.

The acid-containing macromonomer may be formed by polymerization of a reaction mixture including an acid functional olefinically unsaturated monomer, optionally a hydroxy functional olefinically unsaturated monomer, and optionally an olefinically unsaturated monomer different from hydroxy functional unsaturated monomer and acid functional unsaturated monomer. The acid functional olefinically unsaturated monomer may be included in the reaction mixture in an amount of from about 5 to 100 wt. % based on a total weight of all monomers included in the reaction mixture to form the acid-containing macromonomer. In certain embodiments, the acid-containing macromonomer may be formed by polymerization of a reaction mixture including the acid functional olefinically unsaturated monomer in an amount of from about 10 to about 80 wt. %, the hydroxy functional olefinically unsaturated monomer in an amount of from 0 to about 60 wt. %, and the olefinically unsaturated monomer different from hydroxy functional unsaturated monomer and acid functional unsaturated monomer in an amount of from 0 to about 90 wt. %, each based on a total weight of all monomers included in the reaction mixture to form the acid-containing macromonomer.

Non-limiting examples of suitable acid functional olefinically unsaturated monomers include olefinically unsaturated carboxylic acids, phosphonic acids, phosphoric acids, and sulfonic acids. Non-limiting examples of suitable olefinically unsaturated carboxylic acids are acrylic acid, methacrylic acid, crotonic acid and isocrotonic acid. Non-limiting examples of suitable olefinically unsaturated phosphoric, phosphonic and sulfonic acids are styrene sulfonic acid, acrylamido methyl propane sulfonic acid, methacryloxyethyl phosphate vinyl phosphonic acid and the like. In certain embodiments, the acid functional olefinically unsaturated monomer includes acrylic acid, methacrylic acid, or a combination thereof. In an exemplary embodiment, the acid functional olefinically unsaturated monomer includes methacrylic acid.

Non-limiting examples of suitable hydroxy functional olefinically unsaturated monomers include hydroxyalkyl esters of alpha, beta-olefinically unsaturated monocarboxylic acids having primary or secondary hydroxyl groups. Further non-limiting examples include the hydroxyalkyl esters of acrylic acid, methacrylic acid, crotonic acid and/or itaconic acid. The hydroxyalkyl radicals may contain, for example, 1 to 10 carbon atoms or alternatively 2 to 6 carbon atoms. Non-limiting examples of suitable hydroxyalkyl esters of alpha, beta-olefinically unsaturated monocarboxylic acids having primary hydroxyl groups are 2-hydroxyethyl(meth)acrylate, 3-hydroxypropyl(meth)acrylate, 4-hydroxybuty1 (meth)acrylate, 5-hydroxyamyl(meth)acrylate, 6-hydroxyhexyl(meth)acrylate, or combinations thereof. Non-limiting examples of suitable hydroxyalkyl esters having secondary hydroxyl groups include 2-hydroxypropyl (meth)acrylate, 2-hydroxybutyl(meth)acrylate, 3-hydroxybutyl(meth)acrylate, or combinations thereof. Further hydroxy functional olefinically unsaturated monomers which may be used are reaction products of alpha, beta-unsaturated monocarboxylic acids with glycidyl esters of saturated monocarboxylic acids branched in the alpha position, e.g., with glycidyl esters of saturated alpha-alkylalkane monocarboxylic acids or alpha, alpha'-dialkylalkane monocarboxylic acids. In certain embodiments, these are the reaction products of (meth)acrylic acid with glycidyl esters of saturated alpha, alpha'-dialkylalkane monocarboxylic acids having from 7 to 13 carbon atoms in the molecule or alternatively from 9 to 11 carbon atoms in the molecule. Other hydroxy-functional unsaturated monomers are polyethylene oxide and/or polypropylene oxide modified (meth) acrylates. In exemplary embodiments, the hydroxy functional olefinically unsaturated monomers include hydroxyalkyl esters of acrylic acid and methacrylic acid.

Non-limiting examples of suitable further olefinically unsaturated monomers include monomers which may contain, apart from an olefinic double bond, further functional groups or may contain, apart from an olefinic double bond, no further functional groups. Examples of suitable ethylenically unsaturated monomers which contain apart from an olefinic double bond no further functional groups are esters of olefinically unsaturated carboxylic acids. These may be esters of olefinically unsaturated carboxylic acids with aliphatic, aromatic and/or cycloaliphatic alcohols. Non-limiting examples of suitable olefinically unsaturated carboxylic acids include acrylic acid, methacrylic acid, crotonic acid, isocrotonic acid, or combinations thereof. The alcohols may be aliphatic monohydric branched or unbranched alcohols having from 1 to 20 carbon atoms in the molecule. In certain embodiments, the esters may be esters of acrylic and methacrylic acid with aliphatic alcohols, e.g. methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates.

The alcohols may also be aromatic or cycloaliphatic monohydric branched or unbranched alcohols having from 4 to 20 carbon atoms in the molecule. In certain embodiments, the alcohol is aromatic. The substituents include, as non-limiting examples, from one to three alkyl groups, and in embodiments those having from 1 to 4 carbon atoms. Non-limiting examples include (meth)acrylates with aromatic or cycloaliphatic alcohols are benzyl (meth)acrylate, phenoxy ethyl (meth)acrylate, phenyl (meth)acrylate, cyclohexyl acrylate, trimethylcyclohexyl acrylate, 4-tert. butylcyclohexyl acrylate, isobornyl acrylate and the corresponding methacrylates. The aliphatic and cycloaliphatic(meth) acrylates may also be substituted with groups containing heteroatoms, such as halogens and ethers.

Further non-limiting examples of suitable monomers include vinyl esters, e.g. vinyl acetate, vinyl propionate, vinyl silanes and vinyl esters of saturated monocarboxylic acids branched in the alpha position, e.g., vinyl esters of saturated alpha,alpha'-dialkylalkane monocarboxylic acids and vinyl esters of saturated alpha-alkylalkane monocarboxylic acids having in each case from 5 to 13 carbon atoms or alternatively from 9 to 11 carbon atoms in the molecule.

Further non-limiting examples of suitable olefinically unsaturated monomers which contain, apart from an olefinic double bond, further functional groups include acetoacetate, and silane functional unsaturated monomers, such as acetoacetoxyethyl(meth)acrylate, and methacryloxyethyl trialkoxysilanes.

Furthermore, it is possible to use olefinically unsaturated monomers having more than 1, e.g. 2 olefinic double bonds in the molecule. This may be utilized to increase branching and/or increase molecular weight. However, the concentration of these groups must be limited to prevent gelling.

In embodiments, the acid-containing macromonomer is substantially free of monomers with base groups, such as amino groups, such as dimethyl amino ethyl methacrylate, diethyl amino ethyl methacrylate and t-butyl amino ethyl methacrylate to avoid in-situ salt formation during polymerization.

In certain embodiments, the acid-containing macromonomer is prepared by polymerization of a reaction mixture including (meth)acrylic acid in an amount of from about 5 to 100, alternatively from about 10 to about 80, or alternatively from about 15 to about 60, wt %, based on a total weight of the monomers included in the reaction mixture to form the acid-containing macromonomer. The reaction mixture may further include a hydroxy functional (meth)acrylic acid ester in an amount of from 0 to about 80, alternatively from 0 to about 60, or alternatively from 0 to about 40, wt. %, based on a total weight of the monomers included in the reaction mixture to form the acid-containing macromonomer. The reaction mixture may further include other (meth)acrylic acid esters in an amount of from 0 to about 95, alternatively from 0 to about 90%, or alternatively from 0 to about 85, wt. %, each based on a total weight of the monomers included in the reaction mixture to form the acid-containing macromonomer. It is to be appreciated that the inclusion of the other monomers into acid-containing macromonomer should not significantly impact the acid-functionality of the acid-containing macromonomer.

The reaction mixture to form the graft copolymer may include the acid-containing macromonomer in an amount of from about 10 to about 50, alternatively from about 15 to about 45, or alternatively from about 20 to about 40, wt. % based on a total weight of a combination of the monomers and macromonomers in the reaction mixture to form the graft copolymer.

The alkoxylated moiety may be at least any portion of a compound, a monomer, an oligomer, a macromonomer, a pre-polymer, or a polymer including an alkoxy group. The alkoxylated moiety may be formed from an olefinically unsaturated alkoxylated macromonomer. The alkoxylated macromonomer may have a weight average molecular weight of at least 250, alternatively from about 250 to about 10,000, alternatively from about 500 to about 5,000, or alternatively from about 500 to about 3,000. The alkoxylated macromonomer may be formed from hydrophilic poly(alkylene glycol) containing ethylenically unsaturated macromonomers that have 2 to 4 carbon atoms in each alkylene group which may be the same or different. The alkoxylated macromonomer may include only one terminal double bond which is polymerized into the polymeric backbone of the graft copolymer along with the olefinically unsaturated amine-containing compound and the olefinically unsaturated acid-containing macromonomer. In certain embodiments, the alkoxylated macromonomer is a poly(ethylene and/or propylene glycol) containing (meth)acrylic macromonomer. This macromonomer is typically formed by polymerizing a reaction mixture including one or more nonionic alkylene oxide monomer(s) in the presence of an ethylenically unsaturated acid monomer, such as (meth)acrylic acid. The alkoxylated macromonomer can contain a hydroxyl group at the terminus opposite the polymerizable double bond to provide a further reactive site separated from the polymeric backbone that is capable of reacting with the film forming components present in the coating composition, which, in turn, enable the graft copolymer to become a permanent part of the final film network. It is to be appreciated that the inclusion of the other monomers into the alkoxylated macromonomer should not significantly impact the alkoxy-functionality of the alkoxylated macromonomer.

In an exemplary embodiment, the alkoxylated macromonomer includes poly(ethylene glycol) mono(meth)acrylates represented by the general formula

where $R^1$=H or $CH_3$, $R^2$=H or $CH_3$, m is 0-20, and n is about 10-100. Non-limiting examples of the alkoxylated macromonomer include methoxy poly(ethylene glycol) monomethacrylate (weight average molecular weight 500-3,000) and poly(ethylene glycol) monomethacrylate (weight average molecular weight 500-3,000). Methoxy poly(ethyleneglycol) monomethacrylate is commercially available from GEO® Specialty Chemicals, Inc. of Ambler, Pa. under the tradename Bisomer such as Bisomer® S20W.

The reaction mixture to form the graft copolymer may include the alkoxylated macromonomer in an amount of from about 10 to about 50, alternatively from about 15 to about 45, or alternatively from about 20 to about 40, wt. % based on a total weight of a combination of the monomers and macromonomers in the reaction mixture to form the graft copolymer.

Turning back to the graft copolymer, in certain embodiments, the polymeric backbone of the graft copolymer is adapted to bind to surfaces of pigments. In further embodiments, the combination of the first side chain including the acid-containing moiety and the second side chain including the alkoxylated moiety render the graft copolymer soluble in aqueous carrier mediums thereby maintaining dispersion of the pigment. The use of mixed side chains or "arms" may provide broader solubility characteristics and utility as a pigment dispersant in high performance water borne coatings.

In various embodiments, the polymeric backbone is hydrophobic relative to the first side chain or the second side chain, the first side chain is hydrophilic relative to the polymeric backbone and is anionic, and the second side chain is hydrophilic relative to the polymeric backbone and is nonionic. The hydrophobic polymeric backbone has affinity for the pigment surface and is adapted to anchor the graft copolymer to the pigment surface, while the first and second side chains of the graft copolymer are formed from a mixture of discrete anionic and nonionic hydrophilic macromonomers that are polymerized into the polymeric backbone. Having both anionic and nonionic functionality in the side chains provides an optimum balance of dispersibility and water sensitivity. The macromonomer side chains and/or the polymeric backbone may have reactive functionalities capable of reacting with a crosslinking agent. In certain embodiments, such reactive functionalities are present on both the polymeric backbone and the macromonomer side chains.

The graft copolymer includes the polymeric backbone in an amount of from about 10 to about 90, alternatively about 20 to about 90, or alternatively about 40 to about 90, wt. % based on a total weight of the graft copolymer. The graft copolymer includes a combination of the first and second side chains in an amount of from about 10 to about 90, alternatively about 20 to about 90, or alternatively about 40 to about 90, wt. % based on a total weight of the graft copolymer. The graft copolymer has a weight average molecular weight of from about 4,000 to about 100,000, alternatively from about 4,000 to about 40,000, or alternatively from about 4,000 to about 30,000. The weight ratio of the first side chain (acid-containing moiety) to the second side chain (alkoxylated moiety) included in the graft copolymer is in the range of from about 10:90 to about 90:10, or alternatively from about 30:70 to about 70:30.

The polymeric backbone portion of the graft copolymer may be formed primarily from polymerized ethylenically unsaturated hydrophobic monomers and, in certain embodiments, hydrophobic (meth)acrylic monomers. The polymeric backbone may include polymerized monomers having functional groups in an amount of up to 30% by weight or alternatively 10 to 20 wt. % based on a total weight of the polymeric backbone. These polymerized monomers having functional groups may be known as pigment anchoring groups that enhance the pigment binding force.

The reaction mixture for forming the polymeric backbone may include, in addition to the amine-containing compound, the acid-containing macromonomer and the alkoxylated macromonomer, other olefinically unsaturated monomers, such as alkyl (meth)acrylates, cycloaliphatic (meth)acrylates and aromatic (meth)acrylates. Typical alkyl (meth)acrylates have from 1 to 18 carbons in the alkyl group such as methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, pentyl (meth)acrylate, hexyl(meth) acrylate, 2-ethyl hexyl (meth)acrylate, nonyl (meth)acrylate, lauryl (meth)acrylate, and the like. Cycloaliphatic (meth)acrylates can be used such as cyclohexylacrylate, trimethylcyclohexyl (meth)acrylate, t-butyl cyclohexyl (meth)acrylate, and the like. Aromatic (meth) acrylates such as benzyl (meth)acrylate, phenyl (meth)acrylate, and phenoxy ethyl (meth)acrylic also can be used.

Other polymerizable monomers can also be used for forming the polymeric backbone, such as styrene, a-methyl styrene, vinyl acetate, vinyl butyrate, vinyl pyrrolidone, and the like. In certain embodiments, the reaction mixture further includes an olefinically unsaturated (meth)acrylic monomer to form the polymeric backbone.

In embodiments, aromatic monomers may be included in the reaction mixture to form the polymeric backbone for improving hydrophobic properties and stability of the polymeric backbone. The olefinically unsaturated aromatic monomer may be selected from the group of benzyl (meth) acrylate, phenyl (meth)acrylate, phenoxy ethyl (meth) acrylic, styrene, a-methyl styrene, and combinations thereof. The reaction mixture to form the polymeric backbone of the graft copolymer may include the aromatic monomer in an amount of at least 30%, alternatively from about 30 to about 80, or alternatively 50 to 80, wt. % based on a total weight of the polymeric backbone. In an exemplary embodiment, the aromatic monomer is benzyl methacrylate.

The reaction mixture to form the graft copolymer may include the other olefinically unsaturated monomers in an amount of from about 1 to about 60, alternatively from about 10 to about 50, or alternatively from about 30 to about 45, wt. % based on a total weight of a combination of the monomers and macromonomers in the reaction mixture to form the graft copolymer.

The graft copolymer may be formed by conventional free radical polymerization by combining the polymeric backbone monomers including the amine-containing compound, the acid-containing macromonomer, the alkoxylated macromonomer, solvent and a polymerization initiator, and polymerizing the reaction mixture at the reflux temperature of the reaction mixture for about 4 to about 8 hours until the graft copolymer is formed of the desired molecular weight.

Typical solvents that can be used to form the graft copolymer include alcohols such as methanol, ethanol, n-propanol, and isopropanol, ketones such as acetone, butanone, pentanone, hexanone, and methyl ethyl ketone, alkyl esters of acetic, propionic, and butyric acids such as ethyl acetate, butyl acetate, and amyl acetate, ethers such as tetrahydrofuran, diethyl ether, and ethylene glycol and polyethylene glycol monoalkyl and dialkyl ethers such as cellosolves and carbitols, and glycols such as ethylene glycol and propylene glycol, and mixtures thereof.

Any of the commonly used azo or peroxy polymerization initiators can be used for preparation of the graft copolymer provided it has solubility in the solution of the solvents and the monomer mixture, and has an appropriate half life at the temperature of polymerization. "Appropriate half life" as used herein is a half life of about 10 minutes to about 4 hours. In certain embodiments, the initiators are azo type initiators such as 2,2'-azobis(isobutyronitrile), 2,2'-azobis (2,4-dimethylvaleronitrile), 2,2'-azobis(methylbutyronitrile), and 1,1'-azobis(cyanocyclohexane). Examples of peroxy based initiators are benzoyl peroxide, lauroyl peroxide, t-butyl peroxypivalate, t-butyl peroctoate. In certain embodiments, the azo polymerization initiator includes 2,2'-Azobis(methylbutyronitrile). 2,2'-Azobis(methylbutyronitrile) is commercially available from The Chemours™ Company of Wilmington, Del. under the tradename Vazo™ such as Vazo™ 67. The reaction mixture to form the graft copolymer may include the polymerization initiator in an amount of from about 1 to about 10, alternatively from about 0.5 to about 15, or alternatively from about 0.1 to about 20, wt. % based on a total weight of a combination of the monomers and macromonomers in the reaction mixture to form the graft copolymer (i.e., excluding the catalysts).

After the graft copolymer is formed, it may be then neutralized with an amine or an inorganic base such as ammonia or sodium hydroxide and then water is added to form a neutralized polymer solution. Typical amines that can be used include amino methyl propanol, amino ethyl propanol, dimethyl ethanol amine, triethylamine and the like. In certain embodiments, the amine is amino methyl propanol and the inorganic base is ammonium hydroxide. The acid-containing macromonomer may be neutralized before the polymeric backbone is formed to avoid possible reactions with the functional groups present in the polymeric backbone portion.

In an exemplary embodiment, the graft copolymer is formed from a reaction mixture including benzyl methacrylate (BzMA) in an amount of from about 20 to about 30 wt. %, n-butyl methacrylate (BMA) in an amount of from about 1 to about 10 wt. %, 2-hydroxyethyl methacrylate (HEMA) in an amount of from about 1 to about 10 wt. %, n-vinyl imidazole in an amount of from about 5 to about 15 wt. %, the acid-containing macromonomer in an amount of from about 25 to about 35 wt. %, and the alkoxylated macromonomer in an amount of from about 20 to about 30 wt. %, in the presence of an alkylation agent in an amount of from about 1 to about 10 wt. % and a polymerization initiator in an amount of from about 1 to about 10 wt. %, each based on a total weight of a combination of the monomers and macromonomers in the reaction mixture to form the graft copolymer (i.e., excluding the catalysts).

The graft copolymer may be useful in making aqueous pigment dispersions and mill bases for paints and other coatings. To form a pigment dispersion or a mill base, pigments are added to a neutralized solution of the graft copolymer in the customary aqueous carrier medium and then are dispersed using conventional techniques such as high speed mixing, ball milling, sand grinding, attritor grinding, horizontal or vertical media mill grinding, or two or three roll milling. The resulting pigment dispersion has a pigment to dispersant binder weight ratio of from about 0.1:100 to about 10,000:100.

Any of the conventional pigments used in paints can be used to form the pigment dispersion. Non-limiting examples of suitable pigments include metallic oxides such as titanium dioxide, iron oxides of various colors, and zinc oxide; carbon black; filler pigments such as talc, china clay, barytes, carbonates, and silicates; a wide variety of organic pigments such as quinacridones, phthalocyanines, perylenes, azo pigment, and indanthrones carbazoles such as carbazole violet, isoindolones, thioindigio reds, and benzimidazolinones; and metallic flakes such as aluminum flake, pearlescent flakes, and the like.

Other optical ingredients may be included in the pigment dispersion such as antioxidants, flow control agents, UV stabilizers, light quenchers and absorbers, and rheology control agents such as fumed silica and microgels. Other film forming polymers can also be added such as acrylics, acrylourethanes, polyesters and polyester urethanes, alkyds, polyethers and polyether urethanes, and the like that are compatible with the pigment dispersion.

Water miscible organic compounds as co-solvents can be used in the coating dispersant to enhance wetting and/or to improve stability. Non-limiting examples of suitable co-solvents include alcohols such as methanol, ethanol, n-propanol, and isopropanol, ketones such as acetone, butanone, pentanone, hexanone, and methyl ethyl ketone, alkyl esters of acetic, propionic, and butyric acids such as ethyl acetate, butyl acetate, and amyl acetate, ethers such as tetrahydrofuran, diethyl ether, and ethylene glycol and polyethylene glycol monoalkyl and dialkyl ethers such as cellosolves and carbitols, and glycols such as ethylene glycol and propylene glycol, and mixtures thereof.

The pigment dispersion can be added to a variety of water borne coating or paint compositions such as primers, primer surfacers, topcoats which may be monocoats, or basecoats of a clearcoat/basecoat finish. These compositions may contain film-forming polymers such as hydroxy functional acrylic and polyester resins and crosslinking agents such as blocked isocyanates, alkylated melamines, polyisocyanates, epoxy resins, and the like. In certain embodiments, the film-forming polymer of the coating composition is similar to the polymer of the pigment dispersion so that on curing the polymer of the pigment dispersion will cure with the coating polymer and become a permanent part of the film or coating by reacting with crosslinkers.

A coating composition for coating a substrate is also provided herein. The coating composition may be utilized to coat any type of substrate known in the art. In embodiments, the substrate is a vehicle, automobile, or automobile vehicle. "Vehicle" or "automobile" or "automobile vehicle" includes an automobile, such as, car, van, mini van, bus, SUV (sports utility vehicle); truck; semi truck; tractor; motorcycle; trailer; ATV (all terrain vehicle); pickup truck; heavy duty mover, such as, bulldozer, mobile crane and earth mover; airplanes; boats; ships; and other modes of transport. The coating composition may also be utilized to coat substrates in industrial applications such as buildings; fences; stationary structures; bridges; pipes; cellulosic materials (e.g., woods, paper, fiber, etc.).

The coating composition includes pigment, the graft copolymer water, and, optionally organic solvent. The coating composition may include the water in an amount of at least 50 wt. % based on a total weight percent of a combination of the water and the organic solvent in the coating composition when the organic solvent is present. Additional components, such as binders, crosslinking agents, additional solvents, pigments, catalysts, rheology modifiers, antioxidants, UV stabilizers and absorbers, leveling agents, antifoaming agents, anti-cratering agents, or other conventional additives can be included in the coating composition.

EXAMPLES

Examples 1-4 below describe preparation of exemplary graft copolymers of this disclosure. Examples 5 and 6 below describe comparative graft copolymers. Examples 7 provides an evaluation of the exemplary graft copolymers of Examples 1-4 and the comparative graft copolymers of Examples 5 and 6 as pigment dispersants.

Example 1

Preparation of
BzMA/BMA/HEMA/VM(MTS)//g-Bisomer
S20W/Macromonomer copolymer,
28.016/6.55/7.48/9.35(6.48)//28.06/14.03% by
weight Example 1 describes the preparation of a graft copolymer with hydrophilic anionic groups and hydrophilic non-ionic groups on the side chains and hydrophobic groups, amine groups, and quaternary ammonium groups on the backbone that can be utilized to disperse and stabilize pigments in a waterborne coating composition. A 5-liter flask was equipped with a thermometer, stirrer, additional funnels, heating mantel, reflux condenser and a means of maintaining a nitrogen blanket over the reactants. The flask was held under nitrogen positive pressure and the following ingredients were employed (Table 1).

TABLE 1

|  | Weight (gram) |
|---|---|
| Portion 1 | |
| Alkoxylated macromonomer (Bisomer S20W) (50% solution in water) | 864 |
| Acid containing macromonomer | 502.33 |
| N-Vinyl imidazole (VM) | 72 |
| Isopropanol | 160 |
| Portion 2 | |
| Benzyl methacrylate (BzMA) | 432 |
| N-Butyl methacrylate (BMA) | 100.8 |
| 2-Hydroxyethyl methacrylate (HEMA) | 115.2 |
| N-Vinyl imidazole | 72 |
| Portion 3 | |
| Isopropanol | 14 |
| Portion 4 | |
| 2,2'-Azobis(methylbutyronitrile) (Vazo ®) | 66 |
| Isopropanol | 200 |
| Methyl ethyl ketone | 200 |
| Portion 5 | |

TABLE 1-continued

| | Weight (gram) |
|---|---|
| Isopropanol | 14 |
| Portion 6 | |
| Methyl p-toluenesulfonate (MTS) | 99.73 |
| N-Butanol | 5.77 |
| Portion 7 | |
| N-Butanol | 15 |
| Total | 2932.83 |

Portion 1 mixture was charged to the flask. The mixture was heated to reflux temperature and refluxed for about 10 minutes. Portion 2 was fed to the flask over 180 minutes. The Portion 4 was simultaneously fed to the flask over 210 minutes. The Portion 3 was used to rinse the Portion 2 into the flask at the end of the feed. The Portion 5 was used to rinse the Portion 4 at the end of the feed. The reaction mixture was held at reflux temperature throughout the course of feeds and the reaction mixture was refluxed for another 60 minutes. The Portion 6 was added and Portion 7 was used as a rinse. The reaction mixture was refluxed for 1.5 hours. The finished product was cooled and filled out.

The resulting polymer solution was a light yellow clear polymer solution and had a solid content of about 53.48% and a Gardner-Holtz viscosity of T+1/4. The polymer had a 20,300 Mw and a 9,926 Mn based on gel permeation chromatography using polymethylmethacrylate as standard.

The acid-containing macromonomer was prepared using the method described in this disclosure.

Example 2

Preparation of
BzMA/HEMA/VM(MTS)//g-Bisomer
S20W/Macromonomer copolymer,
29.65/7.41/7.41(7.33)//30.12/18.07% by weight Example 2 describes the preparation of a graft copolymer similar to the one described in Example 1 but with a different composition. The resin solution was prepared using the same procedure described in Example 1 with ingredients listed in Table 2.

TABLE 2

| | Weight (gram) |
|---|---|
| Portion 1 | |
| Alkoxylated macromonomer (Bisomer S20W) (50% solution in water) | 1029.6 |
| Acid-containing macromonomer | 718.33 |
| N-Vinyl imidazole (VM) | 63.36 |
| Isopropanol | 140 |
| Methyl ethyl ketone (MEK) | 10 |
| Portion 2 | |
| Benzyl methacrylate (BzMA) | 506.88 |
| 2-Hydroxyehtyl methacrylate (HEMA) | 126.72 |
| N-Vinyl imidazole | 63.36 |
| Portion 3 | |
| Isopropanol | 30 |
| Portion 4 | |

TABLE 2-continued

| | Weight (gram) |
|---|---|
| 2,2'-Azobis(methylbutyronitrile) (Vazo ® 67) | 78 |
| Isopropanol | 200 |
| Methyl ethyl ketone | 180 |
| Portion 5 | |
| Isopropanol | 30 |
| Portion 6 | |
| Methyl p-toluenesulfonate (MTS) | 125.38 |
| N-Butanol | 9.012 |
| Portion 7 | |
| N-Butanol | 15 |
| Total | 3325.65 |

The resulting polymer solution was a light yellow slightly hazy polymer solution and had a solid content of about 52.37% and a Gardner-Holtz viscosity of J+1/2. The polymer had a 15,060 Mw and a 7,326 Mn based on gel permeation chromatography using polymethylmethacrylate as standard.

The acid-containing macromonomer was prepared using the method described in this disclosure.

Example 3

Preparation of
BzMA/BMA/HEMA/VM(MTS)//g-Bisomer
S20W/Macromonomer copolymer,
16.68/11.12/7.41/11.12(7.33)//30.12/16.22% by weight Example 3 describes the preparation of a graft copolymer similar to the one described in Example 1 but with a different composition. The resin solution was prepared using the same procedure described in Example 1 with ingredients listed in Table 3.

TABLE 3

| | Weight (gram) |
|---|---|
| Portion 1 | |
| Alkoxylated macromonomer (Bisomer S20W) (50% solution in water) | 1029.6 |
| Acid-containing macromonomer | 644.65 |
| N-Vinyl imidazole (VM) | 95.04 |
| Isopropanol | 180 |
| Methyl ethyl ketone (MEK) | 80 |
| Portion 2 | |
| Benzyl methacrylate (BzMA) | 285.12 |
| N-Butyl methacrylate (BMA) | 190.08 |
| 2-Hydroxyehtyl methacrylate (HEMA) | 126.72 |
| N-Vinyl imidazole | 95.04 |
| Portion 3 | |
| Isopropanol | 30 |
| Portion 4 | |
| 2,2'-Azobis(methylbutyronitrile) (Vazo ® 67) | 78 |
| Isopropanol | 200 |
| Methyl ethyl ketone | 200 |
| Portion 5 | |
| Isopropanol | 30 |
| Portion 6 | |

TABLE 3-continued

| | Weight (gram) |
|---|---|
| Methyl p-toluenesulfonate (MTS) | 125.26 |
| N- Butanol | 14.00 |
| Portion 7 | |
| N-Butanol | 15 |
| Total | 3418.51 |

The resulting polymer solution was a light yellow slightly hazy polymer solution and had a solid content of about 51.45% and a Gardner-Holtz viscosity of M. The polymer had a 17,938 Mw and a 8,396 Mn based on gel permeation chromatography using polymethylmethacrylate as standard.

The acid-containing macromonomer was prepared using the method described in this disclosure.

Example 4

Preparation of BzMA/HEA/VM//g-Bisomer S20W/Macromonomer Copolymer, 34/8/8//25/25% by weight Example 4 describes the preparation of a graft copolymer similar to the one described in Example 1 except that there are no quaternary ammonium groups on the backbone. The resin solution was prepared using the same procedure described in Example 1 with ingredients listed in Table 4 in a 2-liter flask. Two small initiator adds were used to ensure good conversion from monomers to polymer.

TABLE 4

| | Weight (gram) |
|---|---|
| Portion 1 | |
| Alkoxylated macromonomer (Bisomer S20W) (50% solution in water) | 200 |
| Acid-containing macromonomer | 232.56 |
| N,N-dimethylethanol amine | 21.74 |
| Isopropanol | 15.3 |
| Portion 2 | |
| Benzyl methacrylate (BzMA) | 136 |
| 2-Hydoxyethyl acrylate (HEA) | 32 |
| N-Vinyl imidazole (VM) | 32 |
| Portion 3 | |
| Isopropanol | 10 |
| Portion 4 | |
| 2,2'-Azobis(methylbutyronitrile) (Vazo ® 67) | 12 |
| Isopropanol | 40 |
| Methyl ethyl ketone | 40 |
| Portion 5 | |
| 2,2'-Azobis(methylbutyronitrile) (Vazo ® 67) | 1.2 |
| Isopropanol | 8 |
| Portion 6 | |
| 2,2'-Azobis(methylbutyronitrile) (Vazo ® 67) | 1.2 |
| Isopropanol | 8 |
| Portion 7 | |
| Isopropanol | 10 |
| Total | 800.00 |

The resulting polymer solution was a light yellow slightly clear polymer solution and had a solid content of about 50.88% and a Gardner-Holtz viscosity of 1+2/3. The polymer had a Mw in an amount from 1 to 100,000 and a Mn in an amount from 1 to 100,000 based on gel permeation chromatography using polymethylmethacrylate as standard.

The acid-containing macromonomer was prepared using the method described in this disclosure.

Comparative Example 5

Preparation of BzMA/BA /DM(MTS)//g-Macromonomer copolymer, 18.76/18.76/9.38(6.18)//46.91% by weight Comparative Example 5 describes the preparation of a graft copolymer similar to the one described in Example 1 except that there are no non-ionic stabilizing arms. The resin solution was prepared using the same procedure described in Example 1 with ingredients listed in Table 5 in a 2-liter flask. Two small initiator adds were used to ensure good conversion from monomers to polymer.

TABLE 5

| | Weight (gram) |
|---|---|
| Portion 1 | |
| Acid-containing macromonomer | 465.12 |
| Portion 2 | |
| Benzyl methacrylate (BzMA) | 80 |
| N-Butyl acrylate (BA) | 80 |
| N,N-Dimethylaminoethyl acrylate (DM) | 40 |
| Portion 3 | |
| Isopropanol | 10 |
| Portion 4 | |
| t-Butyl peroctoate (Luperox ® 26 by Arkema Inc. King of Prussia, PA) | 12 |
| Isopropanol | 80 |
| Portion 5 | |
| t-Butyl peroctoate (Luperox ® 26 by Arkema Inc. King of Prussia, PA) | 1.2 |
| Isopropanol | 8 |
| Portion 6 | |
| t-Butyl peroctoate (Luperox ® 26 by Arkema Inc. King of Prussia, PA) | 1.2 |
| Isopropanol | 8 |
| Portion 7 | |
| Isopropanol | 10 |
| Portion 8 | |
| Methyl p-toluenesulfonate (MTS) | 20.83 |
| N- Butanol | 4.12 |
| Portion 9 | |
| N-Butanol | 10 |
| Total | 830.47 |

The resulting polymer solution was a light yellow slightly clear polymer solution and had a solid content of about 52.79% and a Gardner-Holtz viscosity of T+1/2. The polymer had a Mw in an amount from 1 to 100,000 and a Mn in an amount from 1 to 100,000 based on gel permeation chromatography using polymethylmethacrylate as standard.

The acid-containing macromonomer was prepared using the method described in this disclosure.

Comparative Example 6

Preparation of BzMA/BA/VM//g-Macromonomer Copolymer, 20/10/10//50% by weight Comparative Example 6 describes the preparation of a graft copolymer similar to the one described in Example 1 except that there are no non-ionic stabilizing arms and no quaternary ammonium groups on the backbone. The resin solution was prepared using the same procedure described in Example 1 with ingredients listed in Table 6 in a 2-liter flask. Two small initiator adds were used to ensure good conversion from monomers to polymer.

TABLE 6

|  | Weight (gram) |
|---|---|
| Portion 1 | |
| Acid-containing macromonomer | 465.12 |
| Portion 2 | |
| Benzyl methacrylate (BzMA) | 80 |
| n-Butyl acrylate (BA) | 40 |
| N-Vinyl imidazole (VM) | 40 |
| Portion 3 | |
| Isopropanol | 10 |
| Portion 4 | |
| t-Butyl peroctoate (Luperox ® 26 by Arkema Inc. King of Prussia, PA) | 12 |
| Isopropanol | 80 |
| Portion 5 | |
| t-Butyl peroctoate (Luperox ® 26 by Arkema Inc. King of Prussia, PA) | 1.2 |
| Isopropanol | 8 |
| Portion 6 | |
| t-Butyl peroctoate (Luperox ® 26 by Arkema Inc. King of Prussia, PA) | 1.2 |
| Isopropanol | 8 |
| Portion 7 | |
| Isopropanol | 10 |
| Total | 795.52 |

The resulting polymer solution was a light yellow slightly clear polymer solution and had a solid content of about 50.63% and a Gardner-Holtz viscosity of V+1/2. The polymer had a Mw in an amount from 1 to 100,000 and a Mn in an amount from 1 to 100,000 based on gel permeation chromatography using polymethylmethacrylate as standard.

The acid-containing macromonomer was prepared using the method described in this disclosure.

Example 7

Evaluation of the Pigment Dispersants Including the Graft Copolymers

The dispersant effectiveness was determined by sand-grinding a mixture of pigment, solvent, and dispersant, and observing the dispersion quality under an Olympus microscope, 40×. The well dispersed system would have a uniform appearance and the pigment particles would show vigorous Brownian motion. In contrast, the flocculated systems would have islands of flocculated pigment chunks interspersed with areas of relatively clear solvent.

The dispersant solutions were neutralized with amino methyl propanol to a pH in the range of 8.5 to 9.2 and diluted with deionized water to 35% concentrations. The following procedure was utilized to prepare the dispersion samples. To a 2 oz. glass bottle, 15 gm of sand, 20 gm of butyl acetate, 2 gm of pigment and 1 gm of the neutralized graft copolymer dispersant solution were added. The bottle was sealed and agitated on a Red Devil plant shaker for 15 minutes. One drop of the dispersion was placed on a glass plate and protected by a cover glass. The dispersion was observed under the microscope.

TABLE 7

| Pigment | E1 | E2 | E3 | E4 | C5 | C6 |
|---|---|---|---|---|---|---|
| 1 | 1 | 0 | 1 | 0 | 0 | 0 |
| 2 | 0 | 0 | 0 | 0 | 0 | 0 |
| 3 | 0 | 0 | 0 | 0 | 0 | 0 |
| 4 | 0 | 0 | 0 | 1 | 3 | 3 |
| 5 | 0 | 0 | 0 | 3 | 3 | 3 |
| 6 | 0 | 0 | 0 | 0 | 3 | 3 |
| 7 | 0 | 0 | 0 | 0 | 3 | 0 |
| 8 | 0 | 1 | 0 | 0 | 3 | 3 |
| 9 | 0 | 3 | 2 | 0 | 0 | 0 |

Ratings:
0: Deflocculated or dispersed
1: Very slightly flocculated
2: Slightly flocculated
3: Flocculated
Pigments:
1. Palomar blue 248-4828 by Sun Chemical Corp.
2. Monolite blue 3RXH by Heucotech Ltd.
3. Parcyaninie green P-6100 by Parshwnath Dye Chemical India Ltd.
4. Sudaperm yellow 2935P by Sudarshan Chemical Industries Ltd.
5. Novoperm orange HL-70 by Clariant Corp.
6. Cinilex DPP red SRIC by Cinic Chemicals LLC
7. Irgazin yellow L2040 by BASF Corp.
8. Hostaperm red E4G by Clariant Corp.
9. Cinquasia violet L5110 by BASF Corp.

Based on these test results, the exemplary graft copolymers (Example 1-4) exhibited improved performance over the comparative graft copolymers (Examples 5 and 6). In particular, the exemplary graft copolymers exhibited improved performance over comparative Example 5 where no non-ionic stabilizing groups were placed on the graft copolymer or comparative Example 6 where neither non-ionic stabilizing arms nor quaternary ammonium groups were present.

Example 8

Preparation of BzMA/BMA/HEMA/DM(MTS)//g-Bisomer S20W/Macromonomer Copolymer, (28.06/6.55/7.48/9.35(6.48)//28.06/14.03% by weight)

Example 8 describes the preparation of a graft copolymer similar to the one described in Example 1 with a different composition. The amine functionality on the backbone has an acyclic structure from N,N-dimethylaminoethyl acrylate (DM) instead of the cyclic amine structure. The resin solution was prepared using the same procedure described in Example 1 with ingredients listed in Table 8 in a 2-liter flask.

TABLE 8

| | Weight (gram) |
|---|---|
| Portion 1 | |
| Alkoxylated macromonomer (Bisomer S20W) (50% solution in water) | 280.8 |
| Acid-containing macromonomer | 163.26 |
| N,N-Dimethylaminoethyl acrylate (DM) | 23.4 |
| Isopropanol | 52 |
| Portion 2 | |
| Benzyl methacrylate (BzMA) | 140.4 |
| N-Butyl methacrylate (BMA) | 32.76 |
| 2-Hydroxyehtyl methacrylate (HEMA) | 37.44 |
| N,N-Dimethylaminoehtyl acrylate (DM) | 23.4 |
| Portion 3 | |
| Isopropanol | 4.55 |
| Portion 4 | |
| 2,2'-Azobis(methylbutyronitrile) (Vazo ® 67) | 21.25 |
| Isopropanol | 65 |
| Methyl ethyl ketone | 65 |
| Portion 5 | |
| Isopropanol | 4.55 |
| Portion 6 | |
| Methyl p-toluenesulfonate (MTS) | 27.41 |
| N-Butanol | 2.06 |
| Portion 7 | |
| N-Butanol | 4.88 |
| Total | 948.16 |

The resulting polymer solution was a light yellow clear solution and had a solid content of about 53.26% and a Gardner-Holtz viscosity of N+1/2. The polymer had a Mw of 20,341 and a Mn of 9,097 based on gel permeation chromatography using polymethylmethacrylate as standard.

Comparative Example 9

Preparation of BMA/HEA/DM//g-Bisomer S20W/Macromonomer Copolymer, (34/8/8//25/25% by weight)

Comparative Example 9 describes the preparation of a graft copolymer similar to the one described in Example 8 where the acyclic amine N,N-dimethylaminethyl acrylate (DM) is not quaternized with an alkylating agent. The resin solution was prepared using the same procedure described in Example 4 with ingredients listed in Table 9 in a 2-liter flask.

TABLE 9

| | Weight (gram) |
|---|---|
| Portion 1 | |
| Alkoxylated macromonomer (Bisomer S20W) (50% solution in water) | 200.0 |
| Acid-containing macromonomer | 232.56 |
| N,N-Dimethylaminoethyl acrylate (DM) | 15 |
| Isopropanol | 22.04 |
| Portion 2 | |
| N-Butyl methacrylate (BMA) | 136 |
| 2-Hydroxyethyl acrylate (HEA) | 32 |
| N,N-Dimethylaminoehtyl acrylate (DM) | 32 |
| Portion 3 | |
| Isopropanol | 10 |
| Portion 4 | |
| 2,2'-Azobis(methylbutyronitrile) (Vazo ® 67) | 12 |
| Methyl ethyl ketone | 40 |
| Isopropanol | 40 |
| Portion 5 | |
| 2,2'-Azobis(methylbutyronitrile) (Vazo ® 67) | 1.2 |
| Isopropanol | 8 |
| Portion 6 | |
| 2,2'-Azobis(methylbutyronitrile) (Vazo ® 67) | 1.2 |
| Isopropanol | 8 |
| Portion 7 | |
| Isopropanol | 10 |
| Total | 800 |

The resulting polymer solution was a light yellow clear solution and had a solid content of about 49.88% and a Gardner-Holtz viscosity of F+1/2. The polymer had a Mw of 15,115 and a Mn of 7,922 based on gel permeation chromatography using polymethylmethacrylate as standard.

Example 10

Evaluation of the Pigment Dispersants of Example 8 and Comparative Example 9

The dispersions were prepared with the same set of pigments and evaluated using the procedure described in Example 7.

TABLE 10

| Pigment | E8 | C9 |
|---|---|---|
| 1 | 0 | 0 |
| 2 | 0 | 0 |
| 3 | 0 | 0 |
| 4 | 0 | 0 |
| 5 | 0 | 3 |
| 6 | 0 | 0 |
| 7 | 0 | 0 |
| 8 | 0 | 3 |
| 9 | 0 | 0 |

Ratings:
0: Deflocculated or dispersed
1: Very slightly flocculated
2: Slightly flocculated
3: Flocculated Based on these test results, the exemplary graft copolymer (Example 8) with both amine and quaternary ammonium groups on the backbone exhibited improved performance over the comparative graft copolymers (Examples 9) where only amine functionality was incorporated on the backbone.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A graft copolymer, comprising:
   a polymeric backbone comprising a cyclic amine-containing moiety;
   a first side chain bound to the polymeric backbone, wherein the first side chain comprises an acid-containing moiety; and
   a second side chain bound to the polymeric backbone, wherein the second side chain comprises an alkoxylated moiety, and wherein the alkoxylated moiety is formed from an olefinically unsaturated alkoxylated macromonomer having a weight average molecular weight of at least 250.

2. The graft copolymer of claim 1, wherein the polymeric backbone further comprises a quaternary ammonium moiety.

3. The graft copolymer of claim 2, wherein the quaternary ammonium moiety is formed from a reaction of the cyclic amine-containing moiety and an alkylation agent.

4. The graft copolymer of claim 1, wherein the cyclic amine-containing moiety is formed from N-vinyl imidazole, 2-vinyl pyridine, 4-vinylpyridine, vinyl carbazole, or combinations thereof.

5. The graft copolymer of claim 4, wherein the cyclic amine-containing moiety is formed from N-vinyl imidazole.

6. The graft copolymer of claim 1, wherein the acid-containing moiety is formed from an olefinically unsaturated acid-containing macromonomer, and the acid-containing macromonomer is formed from a reaction mixture comprising an olefinically unsaturated acid-functional monomer in the presence of a catalytic chain transfer agent.

7. The graft copolymer of claim 1, wherein the alkoxylated moiety is formed from an olefinically unsaturated alkoxylated macromonomer comprising a methoxy poly(ethyleneglycol) monomethacrylate.

8. The graft copolymer of claim 1, wherein the graft copolymer is formed from a reaction mixture comprising:
   an olefinically unsaturated cyclic amine-containing compound, wherein the olefinically unsaturated cyclic amine-containing compound forms the cyclic amine-containing moiety;
   an olefinically unsaturated acid-containing macromonomer having a weight average molecular weight of at least 500, wherein the olefinically unsaturated acid-containing macromonomer forms the acid-containing moiety; and
   an olefinically unsaturated alkoxylated macromonomer having a weight average molecular weight of at least 250, wherein the olefinically unsaturated alkoxylated macromonomer forms the alkoxylated moiety.

9. The graft copolymer of claim 8, wherein the olefinically unsaturated cyclic amine-containing compound comprises N-vinyl imidazole, 2-vinyl pyridine, 4-vinylpyridine, vinyl carbazole, or combinations thereof.

10. The graft copolymer of claim 8, wherein the reaction mixture further comprises an olefinically unsaturated aromatic monomer to form the polymeric backbone.

11. The graft copolymer of claim 10, wherein the olefinically unsaturated aromatic monomer is selected from the group of benzyl (meth)acrylate, phenyl (meth)acrylate, phenoxy ethyl (meth)acrylic, styrene, a-methyl styrene, and combinations thereof.

12. The graft copolymer of claim 8, wherein the reaction mixture further comprises 2-hydroxyethyl(meth)acrylate, 3-hydroxypropyl(meth)acrylate, or combinations thereof.

13. A graft copolymer, comprising:
    a polymeric backbone comprising a quaternary ammonium moiety formed from a reaction of a cyclic amine-containing moiety and an alkylation agent;
    a first side chain bound to the polymeric backbone, wherein the first side chain comprises an acid-containing moiety; and
    a second side chain bound to the polymeric backbone, wherein the second side chain comprises an alkoxylated moiety, and wherein the alkoxylated moiety is formed from an olefinically unsaturated alkoxylated macromonomer having a weight average molecular weight of at least 250.

14. The graft copolymer of claim 13, wherein the quaternary ammonium moiety is formed from the reaction of the amine-containing moiety and the alkylation agent after the amine-containing moiety has been polymerized into the polymeric backbone.

15. The graft copolymer of claim 13, wherein the cyclic amine-containing moiety is formed from N-vinyl imidazole, 2-vinyl pyridine, 4-vinylpyridine, vinyl carbazole, or combinations thereof.

16. The graft copolymer of claim 13, wherein the acid-containing moiety is formed from an olefinically unsaturated acid-containing macromonomer, and the acid-containing macromonomer is formed from a reaction mixture comprising an olefinically unsaturated acid-functional monomer in the presence of a catalytic chain transfer agent.

17. The graft copolymer of claim 13, wherein the alkoxylated moiety is formed from an olefinically unsaturated alkoxylated macromonomer comprising a poly(ethyleneglycol) mono(meth)acrylate.

18. The graft copolymer of claim 13, wherein the graft copolymer is formed from a reaction mixture comprising:
    an olefinically unsaturated amine-containing compound, wherein the olefinically unsaturated amine-containing compound forms the cyclic amine-containing moiety;
    an olefinically unsaturated acid-containing macromonomer having a weight average molecular weight of at least 500, wherein the olefinically unsaturated acid-containing macromonomer forms the acid-containing moiety; and
    the olefinically unsaturated alkoxylated macromonomer having a weight average molecular weight of at least 250.

19. The graft copolymer of claim 18, wherein the olefinically unsaturated amine-containing compound comprises N-vinyl imidazole, 2-vinyl pyridine, 4-vinylpyridine, vinyl carbazole, or combinations thereof.

20. A coating composition, comprising:
    a pigment;
    a graft copolymer for dispersing the pigment, the graft copolymer comprising;
      a polymeric backbone comprising a cyclic amine-containing moiety,
      a first side chain bound to the polymeric backbone, wherein the first side chain comprises an acid-containing moiety, and
      a second side chain bound to the polymeric backbone, wherein the second side chain comprises an alkoxylated moiety, and wherein the alkoxylated moiety is formed from an olefinically unsaturated alkoxylated macromonomer having a weight average molecular weight of at least 250;

water; and optionally organic solvent, wherein the coating composition comprises the water in an amount of at least 50 wt. % based on a total weight percent of a combination of the water and the organic solvent in the coating composition when the organic solvent is present.

* * * * *